United States Patent
Kobayashi et al.

(10) Patent No.: US 8,165,616 B2
(45) Date of Patent: Apr. 24, 2012

(54) COMMUNICATION DEVICE, BASE STATION, METHOD OF COMMUNICATION, AND COMMUNICATION SYSTEM

(75) Inventors: Takaharu Kobayashi, Kawasaki (JP); Naoyuki Saitou, Kawasaki (JP); Hideki Furudate, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 393 days.

(21) Appl. No.: 12/468,690

(22) Filed: May 19, 2009

(65) Prior Publication Data
US 2010/0035641 A1   Feb. 11, 2010

(30) Foreign Application Priority Data
Aug. 7, 2008   (JP) .................. 2008-203856

(51) Int. Cl.
*H04B 15/00* (2006.01)
(52) U.S. Cl. ........................ 455/502; 455/561
(58) Field of Classification Search .................. 455/502, 455/561; 370/330, 350
See application file for complete search history.

(56) References Cited

U.S. PATENT DOCUMENTS

| 6,542,754 B1 * | 4/2003 | Sayers et al. ................ 455/502 |
| 6,847,826 B1 * | 1/2005 | Wesby et al. ................ 455/502 |
| 6,961,398 B2 * | 11/2005 | Dick et al. ................... 375/356 |
| 2007/0291680 A1 | 12/2007 | Machida |
| 2007/0291713 A1 | 12/2007 | Machida |

FOREIGN PATENT DOCUMENTS

| JP | 20085003 | 1/2008 |
| JP | 20085004 | 1/2008 |

* cited by examiner

*Primary Examiner* — Brian Young
(74) *Attorney, Agent, or Firm* — Fujitsu Patent Center

(57) ABSTRACT

The MS detects a difference in timing or frequency between a reference signal being any one of the received signals from a plurality of BSs and each of the other received signals, notifies the results of detection to BSs other than the source BS of the reference signal, and the BSs other than the source BS of the reference signal control the timing or frequency of transmission of the signal to be received by other MSs other than the MS on the basis of the results of the detection.

20 Claims, 9 Drawing Sheets

COMMUNICATION DEVICE, BASE STATION, METHOD OF COMMUNICATION, AND COMMUNICATION SYSTEM

CROSS-REFERENCE TO RELATED APPLICATION

This application is based upon and claims the benefit of priority of the prior Japanese Application No. 2008-203856 filed on Aug. 7, 2008 in Japan, the entire contents of which are hereby incorporated by reference.

FIELD

The embodiments discussed herein are related to a communication device, a base station, a method of communication of a communication device, a method of communication of a base station, and a communication system. The embodiment can be applied to, for example, a communication system having a plurality of base stations.

BACKGROUND

A wireless communication system communicates between a communication device such as a mobile station (MS) and a base station (BS). The MS can communicates by radio with the BS in the wireless coverage zone (cell or sector) provided by the BS.

The MS may belong to two or more wireless coverage zones and can receive individual signals from two or more BSs. In this case, the MS undergoes an increase in interference of received signals in the case where a plurality of BSs cannot transmit and receive signals in precise synchronization with respective predetermined timings (that is, the synchronization is not established between the BSs). The occurrence and increase of this interferences cause a decrease in efficiency of frequency usage in the wireless communication system.

In order that the MS can stably communicate with a plurality of BSs in their overlapped wireless coverage zone, how to establish the synchronization between the BSs is important.

[Patent Document 1] Japanese Laid-open Patent Publication No. 2008-5003

[Patent Document 2] Japanese Laid-open Patent Publication No. 2008-5004

For example, a method of establishing synchronization between BSs using a global positioning system (GPS) receiver is known. This method requires each of a plurality of BSs to have a GPS receiver. Each BS generates a reference clock signal on the basis of signals from GPS satellites received by the GPS receiver, and performs transmission and reception of signals from/to a MS in synchronization with the reference clock signal. This allows the plurality of BSs to establish synchronization.

However, this method additionally requires antennas to receive signals from GPS satellites, and may expand the scale of the BSs. Besides, a GPS receiver provided for every BS leads to an increase in cost for system infrastructure.

A known method that does not use GPS establishes synchronization through wireless communication between BSs.

In order to ensure establishment of synchronization between BSs by this method, the BSs must be located somewhat closely. Accordingly, the wireless coverage zones for a MS are restricted. Besides, the setup of a communication time for synchronization control between the BSs restricts the communication time between the BSs and the MS. This causes a decrease in throughput of the wireless communication system.

SUMMARY (1) According to an aspect of the embodiment, an apparatus includes a communication device, including a detector which detects a difference in timing or frequency between a reference signal being any of the received signals from a plurality of base stations and each of the other received signals, and a notifying unit which notifies the results of the detection by the detector to base stations other than the source station of the reference signal, wherein the results of the detection are used when the base stations other than the source station of the reference signal control the timing and frequency of transmission of signals to be received by other communication devices other than this communication device.

(2) According to an aspect of the embodiment, an apparatus includes a base station capable of communicating with a communication device, including a receiver which receives results of detection notified by the communication device after detecting a difference in timing or frequency between a signal received from a base station and a reference signal received from another base station, and a controller which controls the timing or frequency of transmission of the signal to be received by other communication devices other than this communication device on the basis of the results of detection received by the receiver.

(3) According to an aspect of the embodiment, a method includes a method of communication of a communication device, including detecting a difference in timing or frequency between a reference signal being any one of the received signals from a plurality of base stations and each of the other received signals, and notifying the results of detection to base stations other than the source station of the reference signal, wherein the results of detection are used when the base stations other than the source station of the reference signal control the timing and frequency of transmission of signals to be received by other communication devices other than this communication device.

(4) According to an aspect of the embodiment, a method includes a method of communication of a base station capable of communicating with a communication device, including receiving the results of detection notified by the communication device after detecting a difference in timing or frequency between a signal received from the base station and a reference signal received from another base station, and controlling the timing or frequency of transmission of the signal to be received by other communication devices other than this communication device on the basis of the results of the detection.

(5) According to an aspect of the embodiment, a system includes a communication system, including a plurality of base stations, at least one communication device capable of communicating with the plurality of base stations, a detector which detects a difference in timing or frequency between a reference signal being any of the received signals from the plurality of base stations and each of the other received signals, a notifying unit which notifies the results of detection by the detector to base stations other than the source station of the reference signal, and a controller which controls the timing or frequency of transmission of signal to be received by other communication devices other than this communication device on the basis of the results of detection notified by the notifying unit.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF THE DRAWING(S)

DESCRIPTION OF EMBODIMENTS

Hereinafter, exemplary embodiments will be described with reference to accompanying drawings. The following exemplary embodiments are merely examples and do not intend to exclude various modifications and variations to the proposed method and/or apparatus that are not specifically described herein. Rather, various modifications or variations may be made to the embodiments (for example, by combining the exemplary embodiments) without departing from the scope and spirit of the proposed method and/or apparatus.

(1) Embodiment

Figure 1:
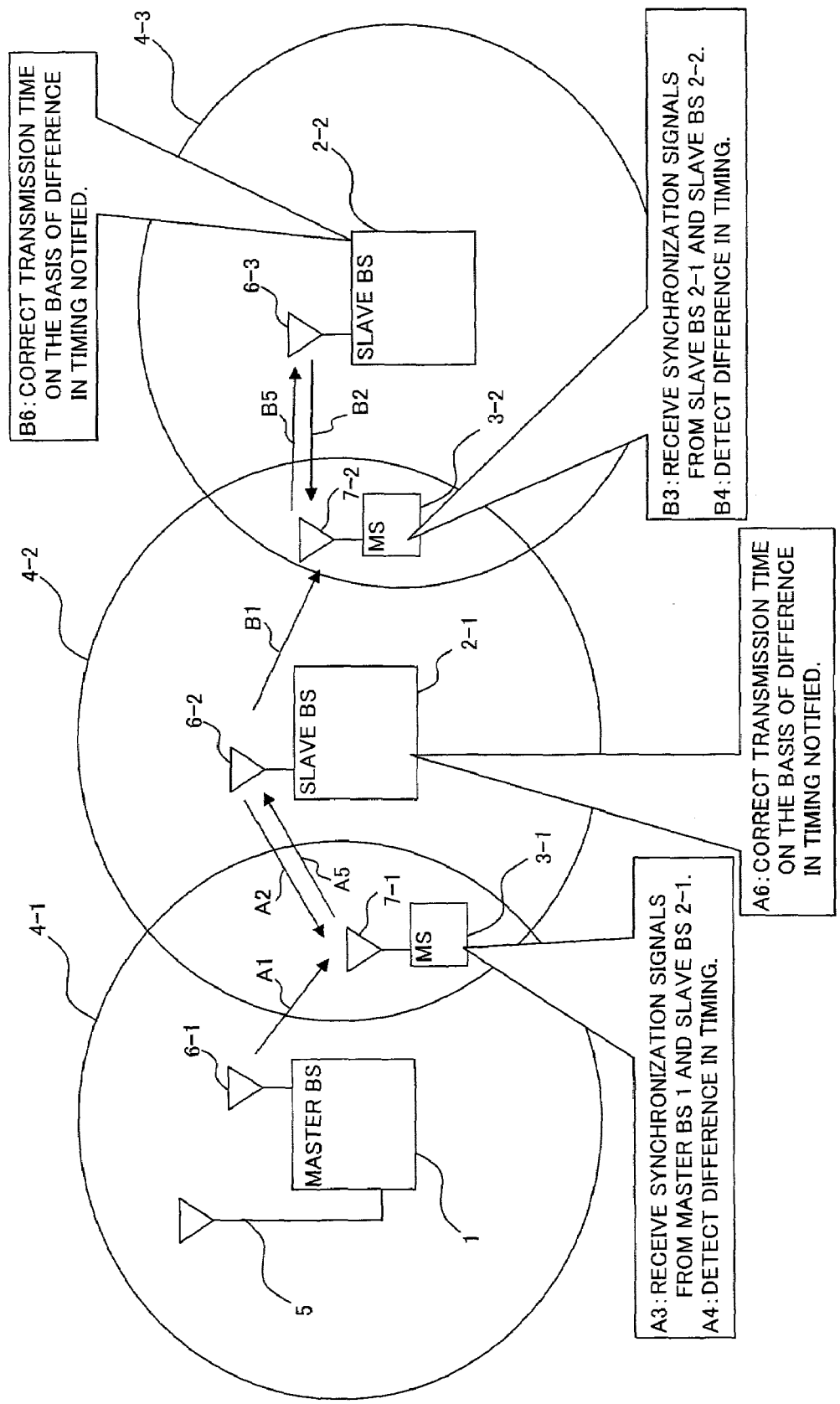
FIG. 1 is a schematic view of a wireless communication system in accordance with an embodiment.

FIG. 1 illustrates a mobile Worldwide Interoperability for Microwave Access (WiMAX) system, which is a wireless communication system in accordance with an embodiment.

The wireless communication system illustrated in FIG. 1 includes a plurality of (three) BSs 1, 2-1, and 2-2, and a plurality of (two) MSs 3-1 and 3-2, by way of example. The BSs 1, 2-1, and 2-2 provide cells 4-1, 4-2, and 4-3, respectively, which represent wireless coverage zones.

The MSs 3-1 and 3-2 can each communicate by radio with any of the BSs 1, 2-1, and 2-2 in the cells 4-1, 4-2, and 4-3, respectively. In an zone overlapping with a plurality of cells, one MS can communicate by radio with the respective BSs. For example, in FIG. 1, the MS 3-1 can communicate with the BSs 1 and 2-1, while the MS 3-2 can communicate with the BSs 2-1 and 2-2.

The BS 1 is a reference BS (master BS) to establish synchronization between BSs, and includes, for example, a GPS receiver. The other BSs 2-1 and 2-2 are slave BSs establishing synchronization between the BSs with reference to the master BS 1, and does not require a GPS receiver. In this embodiment, the slave BSs have no GPS receiver.

In the following description, in the case where a distinction is not made between the slave BSs 2-1 and 2-2, they are referred to simply as the slave BS 2. Similarly, in the case where a distinction is not made between the MSs 3-1 and 3-2, they are referred to simply as the MS 3. The numbers of the master BS 1, the slave BSs 2-1 and 2-2, and the MSs 3-1 and 3-2 are not limited to those in FIG. 1.

In the following description, the direction of the communication from the BS 1 or 2 to the MS 3 is called "downstream", while the direction from the MS 3 to the BS 1 or 2 "upstream".

The master BS 1 includes a GPS antenna 5 and a transmission and reception antenna 6-1, for example. The BS 1 generates a reference clock signal on the basis of a signal (for example, time information) received by the GPS antenna 5, and uses it as an internal clock signal. Hence, synchronization using the GPS can be established between the BS 1 and the MS 3 or between the BSs 1. The master BS 1 also communicates by radio with the MS 3 in the cell 4-1 through the transmission and reception antenna 6-1.

The slave BSs 2-1 and 2-2 have transmission and reception antennas 6-2 and 6-3, respectively, for example. The slave BSs 2-1 and 2-2 can communicate by radio with the MS 3 through the transmission and reception antennas 6-2 and 6-3, respectively.

Besides, the MSs 3-1 and 3-2 have transmission and reception antennas 7-1 and 7-2, respectively, for example. The MSs 3-1 and 3-2 can communicate by radio with the BSs 1 and 2 through the transmission and reception antennas 7-1 and 7-2, respectively.

In the above wireless communication system, this embodiment proposes a method of establishing synchronization between, for example, the master BS 1 having the GPS receiver and the slave BS 2-1 having no GPS receiver.

For example, the MS 3-1 receives wireless signals from the master BS 1 (A1) and the slave BS 2-1 (A2). These signals can each include a periodical synchronization signal. The synchronization signal in the WiMAX system, which is referred to as "preamble", is used to detect the head of each wireless signal frame (hereinafter referred to as a wireless frame).

The MS 3-1 that receives each synchronization signal (A3) detects a difference in timing (time difference) between a reference signal that is a synchronization signal received from the master BS 1 and a synchronization signal received from the slave BS 2-1 (A4), and then notifies the results of the detection to the slave BS 2-1 (A5).

The slave BS 2-1 that receives the notification, for example, on the basis of the time difference, generates or corrects its internal (reference) clock signal, and then controls (corrects) the timing (time) of communication (not restricted to transmission) with an MS other than the MS 3-1 and with the MS 3-1 (A6). With the slave BS 2-1, the transmission timing of a transmission signal to both the MS other than MS 3-1 and the MS 3-1 may be adjusted through adjustment of the transmission timing of a transmission frame including a preamble on the basis of the received results of the detection.

Figure 2:
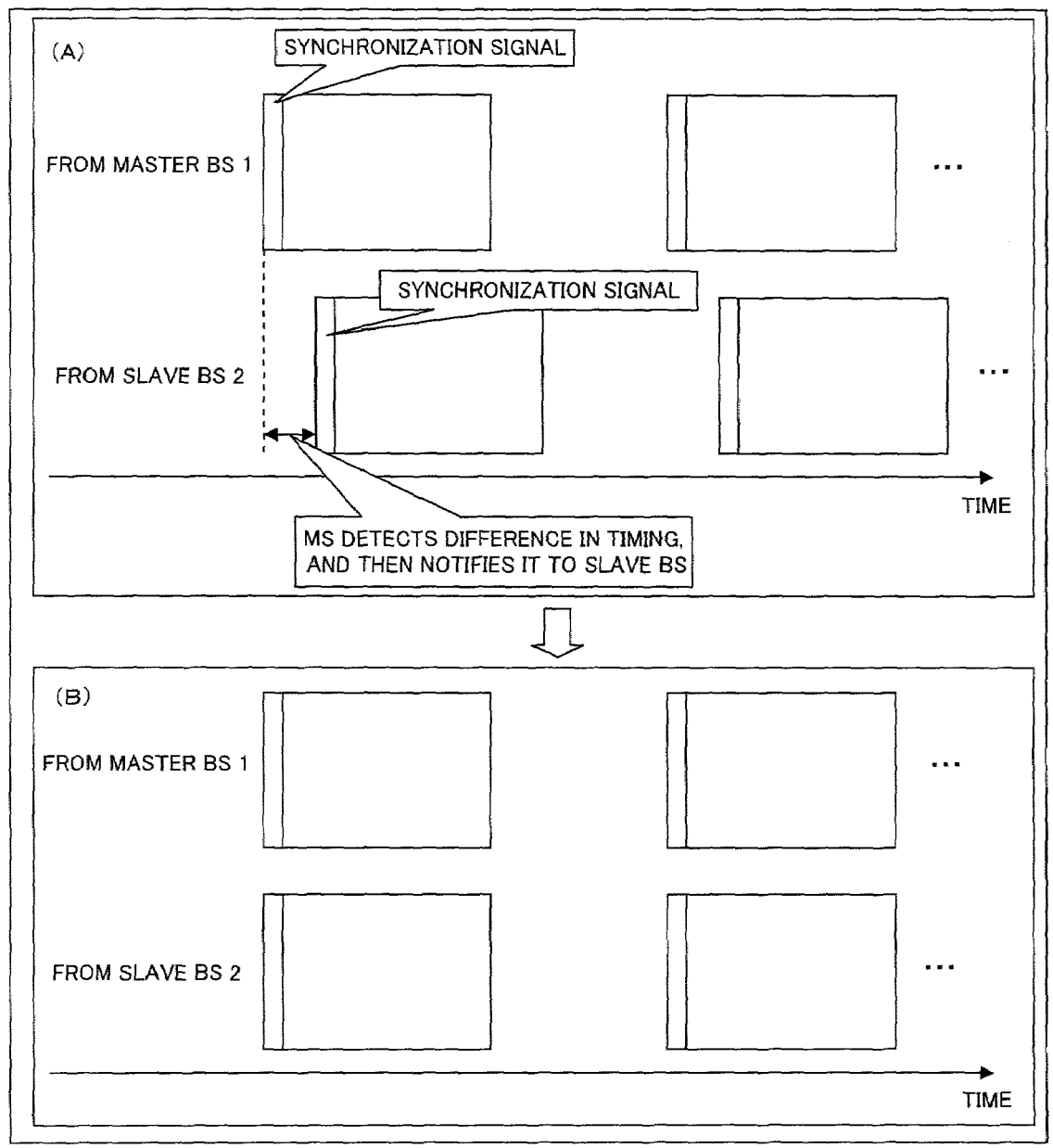
FIG. 2 is a schematic view of a method of synchronization in the wireless communication system illustrated in FIG. 1.

With reference to FIG. 2(A), the MS 3-1 receives, for example, wireless frames transmitted from the master BS 1 and the slave BS 2 in a predetermined period of time. Then, the MS 3-1 detects a difference or deviation in timing of the reception between the synchronization signal of the wireless frame received from the slave BS 2 and the synchronization signal of the wireless frame received from the master BS 1, and then notifies the results of the detection to the slave BS 2. Which synchronization signal leads or lags is determined on the basis of the synchronization signal received from the master BS 1. Where the received synchronization signals are transmitted from can be determined by, for example, a change in pattern of the synchronization signal. This also allows the MS 3-1 to detect information whether the synchronization signal from the slave BS 2 leads or lags by the synchronization signal from BS 1 (lead/lag) and to notify this information to the slave BS 2, in notification of the results of the detection to the slave BS 2-1.

In addition, the MS 3-1, for example, can detect a difference or deviation in frequency of the reception between the synchronization signal from the slave BS 2-1 and the synchronization signal from the master BS 1, and notify it to the slave BS 2. At this time, the MS 3-1 can also detect and notify the direction and magnitude of the deviation. In the case where a difference in timing or deviation in frequency is not detected, the MS 3-1 can notify nothing or can notify that no difference was detected (the synchronization is established).

The slave BS 2-1 that receives the results of the detection from the MS 3-1 generates or corrects an internal clock signal, for example, on the basis of the difference or deviation in timing of the reception to control (correct) a communication (transmission/reception) timing with an MS other than the MS 3-1 or with the MS 3-1 (or these MSs). When the difference in frequency is also notified, the slave BS 2 controls (corrects) the frequency used to communicate with an MS other than the MS 3-1 or with the MS 3-1 (or these MSs) on the basis of the information.

Consequently, with reference to FIG. 2(B), a communication device (for example, MS) other than the MS 3-1 or the MS 3-1 (or these MSs) can receive the signals from the master BS 1 and the slave BS 2 in precise timing and frequency. In other words, synchronization between the master BS 1 and the slave BS 2 can be established.

This embodiment also proposes a method of establishing synchronization, for example, between the slave BSs 2-1 and 2-2.

For example, with reference to FIG. 1, the MS 3-2 receives a wireless signal from the slave BS 2-2 (B2) as well as a wireless signal from BS 2-1 (B1). These wireless signals also include a synchronization signal. The slave BS 2-1 is preferably in synchronization with the master BS 1 using, for example, the aforementioned synchronization process. The slave BS 2-1 in synchronization with the master BS 1 may be referred to as a reference slave BS 2-1.

The MS 3-2 receiving the synchronization signals from the slave BS 2-1 and the slave BS 2-2 (B3) detects a difference in timing (time difference) between the reference signal and the signal from the BS 2-2 (B4) on the basis of, for example, the synchronization signal from the reference slave BS 2-1, and then notifies the time difference to the slave BS 2-2 (B5). At this time, the MS 3-2 may also detect a difference in frequency, in the same manner as that between the master BS 1 and the slave BS 2-1, and then notify the difference to the slave BS 2-2.

The BS 2-2 receiving this notification generates or corrects its reference clock signal, for example, on the basis of the time difference, and then controls or corrects the communication (transmission/reception) timing (transmission/reception time) with an MS other than the MS 3-2 or with the MS 3-2 (or these MSs) in the sell 4-3 on the basis of the reference clock (B6).

In other words, in this embodiment, in the synchronization between the slave BSs 2-1 and 2-2, a wireless signal (synchronization signal) transmitted by the slave BS 2-1 after correction of the timing (frequency) on the basis of the reference signal from the master BS 1 is used as a reference signal to detect a deviation in timing or frequency of the reception at the MS 3-2.

As described above, according to this embodiment, even the slave BS 2 having no GPS receiver (for example, GPS antenna 5) can establish synchronization with the master BS 1 through detection of a deviation in timing or frequency of the reception from a plurality of BSs and notifying the results of the detection to other BSs other than the reference BS at the MS 3. Furthermore, all the BSs in the system do not require a GPS receiver to reduce the scale of the slave BS 2 and associated cost. Besides, the cost of the system infrastructure can be reduced.

In addition, since the synchronization is established using the MS 3 capable of receiving signals from a plurality of BSs, the synchronization can established without keeping a significantly close distance between adjacent BSs (adjacent cells). This moderates the restriction on the distribution of BSs. Besides, synchronization among a large number of BSs can easily be established by repeatedly establishing synchronization between the slave BSs 2 through the MS 3 with reference to one of the BSs.

Furthermore, since a synchronization control time (wireless resource) used to establish synchronization between BSs does not require to be provided fixedly, a communication between a BS and an MS is not restricted by the synchronization control between the BSs. Thus, a time that is equivalent to the synchronization control time (wireless resource) can be used for the communication between the BS and the MS, and this can prevent a decrease in throughput of the communication between the BS and the MS.

In the case where the MS 3 is not present in an overlapping zone of a plurality of cells (overlap zone), the BS 1 and BS 2 cannot receive the notification of the results of detection. Accordingly, they can operate without establishment of the synchronization according to the above-mentioned process. However, since the probability that the MS 3 is not present in the overlap zone at any time is low, the probability of no establishment of the synchronization would also be low.

(2) A Detailed Example of the Wireless Communication System

A detailed example of the wireless communication system is described below.

(2.1) Master BS 1

Figure 3:
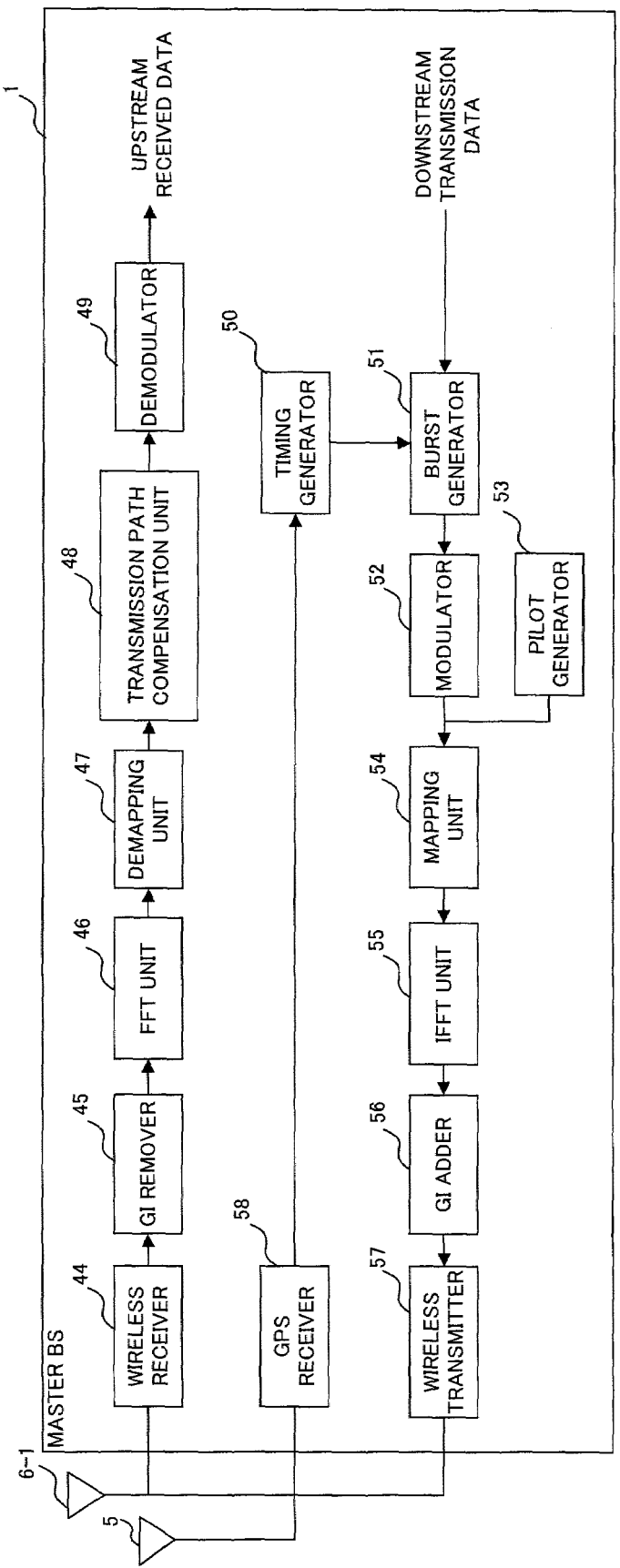
FIG. 3 is a block diagram of the master base station illustrated in FIG. 1.

FIG. 3 is a block diagram of the master BS 1 in accordance with an embodiment. The master BS 1 includes, for example, a GPS antenna 5, a transmission and reception antenna 6-1, a wireless receiver 44, a GI remover 45, an FFT unit 46, a demapping unit 47, a transmission path compensation unit 48, a demodulator 49, and a timing generator 50. The master BS 1 also includes a burst generator 51, a modulator 52, a pilot generator 53, a mapping unit 54, an IFFT unit 55, a GI adder 56, a wireless transmitter 57, and a GPS receiver 58, for example.

The GPS antenna 5 receives radio waves (signals) from GPS satellites (not illustrated).

The transmission and reception antenna 6-1 is a wireless interface that receives an upstream wireless signal transmitted from the MS 3 and transmits a downstream wireless signal to the MS 3. An antenna transmitting the upstream wireless signal and an antenna receiving the downstream wireless signal may be provided separately.

The wireless receiver 44 executes predetermined wireless reception processing for the wireless signal received from the MS 3 through the transmission and reception antenna 6-1. The processing includes, for example, low-noise amplification, frequency conversion to a baseband frequency (down conversion), and AD (analog-to-digital) conversion, for the received wireless signal.

The GI remover 45 removes a guard interval (GI) from the input signal, and then outputs the signal, from which the GI is removed, to the FFT unit 46.

The FFT unit 46 performs a fast Fourier transform (FFT) process on the signal output from the GI remover 45 to convert the time domain signal into a frequency domain signal, and then sends the converted signal to the demapping unit 47.

The demapping unit 47 extracts (demaps) the signal (symbol) mapped into the subcarrier of the signal from the FFT unit 46. The signal demapped by the demapping unit 47, for example, is demultiplexed into a pilot symbol and a data symbol. The pilot symbol is sent to a transmission path estimating unit (not illustrated), while the data symbol is sent to the transmission path compensation unit 48.

The transmission path compensation unit 48 compensates for the transmission path of the data symbol demultiplexed by the demapping unit 47 using an estimated transmission path response estimated from a combined pilot symbol in each subcarrier group.

The demodulator 49 demodulates the data symbol after the transmission path compensation by a demodulation method corresponding to the modulation method used in the MS 3, and then outputs upstream received data. Examples of usable modulation methods include quadrature phase shift keying (QPSK), 16 quadrature amplitude modulation (16 QAM), and 64 quadrature amplitude modulation (64 QAM).

The GPS receiver 58 generates an internal reference clock signal on the basis of the signal received by the GPS antenna 5.

The timing generator 50 generates the timing of generation (transmission) of the signal to be transmitted to the cell 4-1 on the basis of the reference clock signal generated by the GPS receiver 58 in accordance with the predetermined wireless frame. The wireless frame is used for an orthogonal frequency division multiplexing access (OFDMA) method, for example. This wireless frame is an aggregate of wireless resources called "burst" divided by frequencies and time. The BS 1 performs downstream transmission after assigning (mapping) any burst to a downstream transmission data to the MS 3.

The burst generator 51 adds, for example, a preamble to a downstream transmission data such as user data in response to the timing generated by the timing generator 50 to generate a downstream burst signal.

The modulator 52 modulates the downstream burst signal generated by the burst generator 51 in accordance with a predetermined modulation method. Examples of usable modulation methods include QPSK, 16 QAM, and 64 QAM, which are described above. The modulation method to be applied can be changed adaptively (adaptive modulation and coding: AMC) depending on the communication quality between the master BS 1 and MS 3.

The pilot generator 53 generates a pilot signal (also referred to as a reference signal (RS)) that is known between the master BS 1 and the MS 3.

The mapping unit 54 maps the data signal modulated by the modulator 52 and the pilot signal generated by the pilot generator 53 into any of the subcarriers in the frequency domain. The frequency signal obtained from the mapping unit 54 is output to the IFFT unit 55.

The IFFT unit 55 applies an inverse FFT (IFFT) process to the frequency signal from the mapping unit 54 to convert the signal into a time domain signal.

The GI adder 56 adds a guard interval (GI) to the signal from the IFFT unit 55 in the time domain. The GI is used to reduce the effect of inter-symbol interference by delayed waves at the reception side. The signal containing the GI from the GI adder 56 is output to the wireless transmitter 57.

The wireless transmitter 57 processes predetermined wireless transmission for a downstream transmission data to be transmitted to the MS 3 through the transmission and reception antenna 6-1. The wireless transmission includes, for example, DA conversion, frequency conversion into radio frequency (upconversion), and power amplification, for the transmission data to the MS 3.

Thus, the downstream wireless signal generated by the master BS 1 is transmitted to the MS 3 in the cell 4-1 through the wireless transmitter 57 and the transmission and reception antenna 6-1.

(2.2) MS 3

Figure 4:
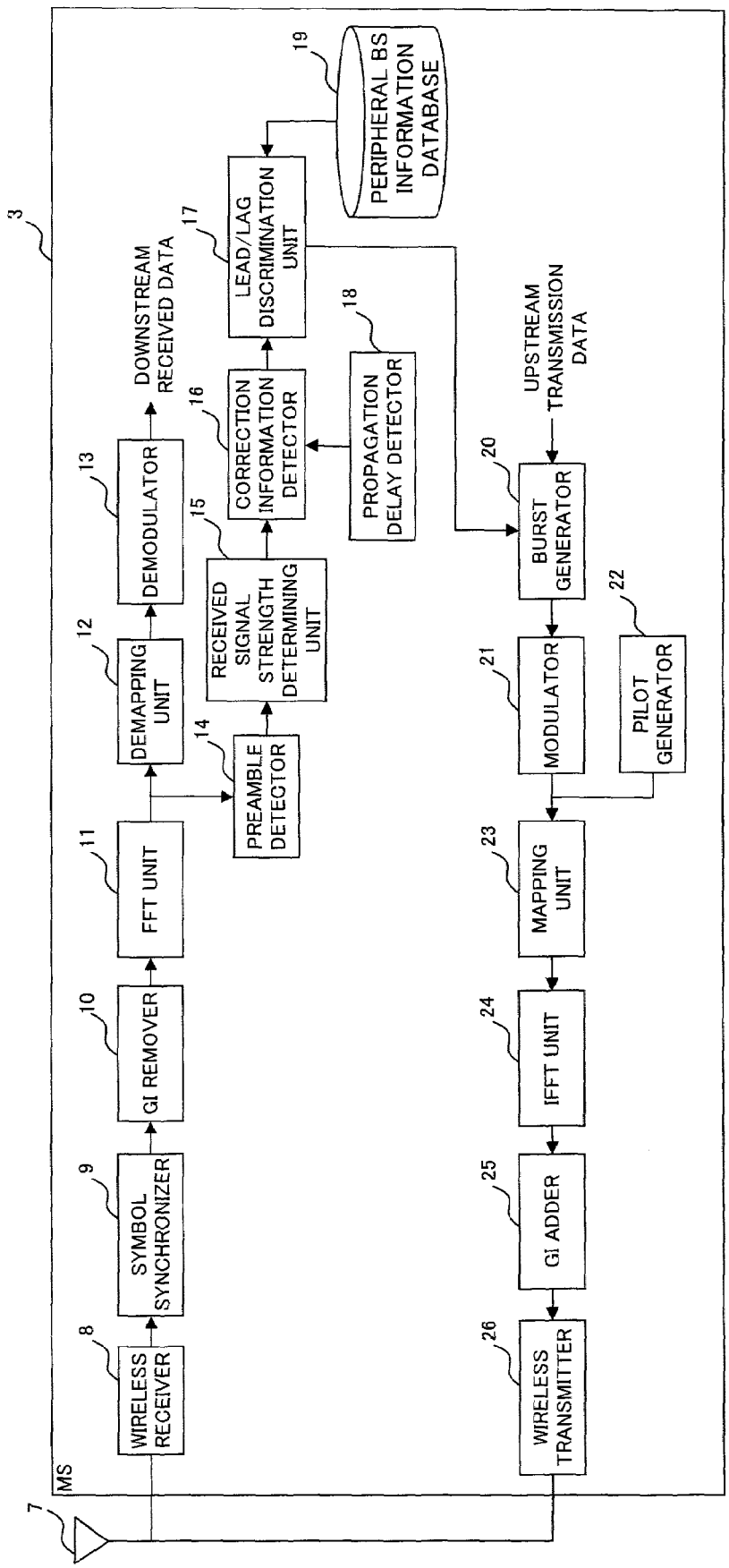
FIG. 4 is a block diagram of the mobile station illustrated in FIG. 1.

FIG. 4 is a block diagram of the MS 3 according to an embodiment. The MS 3 illustrated in FIG. 4 includes, for example, a transmission and reception antenna 7, a wireless receiver 8, a symbol synchronizer 9, a GI remover 10, an FFT unit 11, a demapping unit 12, a demodulator 13, a preamble detector 14, and a received signal strength determining unit 15. The MS 3 also includes, for example, a correction information detector 16, a lead/lag discrimination unit 17, a propagation delay detector 18, a peripheral BS information database 19, a burst generator 20, a modulator 21, a pilot generator 22, a mapping unit 23, an IFFT unit 24, a GI adder 25, and a wireless transmitter 26.

The transmission and reception antenna 7 is a wireless interface that receives a downstream wireless signal transmitted from the BS (any of the master BS 1 or the slave BS 2, and hereinafter the same definition is applied), and transmits an upstream wireless signal to any of the BSs. An antenna for transmission and an antenna for reception may be provided separately.

The wireless receiver 8 executes predetermined wireless reception processing for the wireless signal received from the BS through the transmission and reception antenna 7. Examples of the processing include low-noise amplification, frequency conversion to a baseband frequency (down conversion), and AD (analog-to-digital) conversion, for the received wireless signal.

The symbol synchronizer 9 processes compensation such as filtering for the signal from the wireless receiver 8, and then determines the starting point of a Fourier transform by the FFT unit 11, that is, the symbol synchronization point to achieve symbol synchronization. The symbol synchronization point is set so as to minimize an influence by, for example, delayed waves. The synchronization point can be determined through a process, for example, of compensating for the phase shift using a pilot signal.

The GI remover 10 removes a GI from the signal from the symbol synchronizer 9, and then outputs the signal, from which the GI is removed, to the FFT unit 11.

The FFT unit 11 performs an FFT process on the signal that is output from the GI remover 10 to convert the time domain signal into a frequency domain signal, and then sends the converted signal to the demapping unit 12.

The demapping unit 12 extracts (demaps) a signal (symbol) mapped into a subcarrier of the signal from the FFT unit 11. The signal demapped by the demapping unit 12 is demultiplexed into, for example, a pilot symbol and a data symbol, and the pilot symbol is sent to a transmission path (channel) estimating unit (not illustrated). The data symbol is sent to the transmission path compensation unit 13 after performing transmission path compensation on the basis of the channel value estimated by the transmission path estimating unit.

The demodulator 13 demodulates the data symbol using the demodulation method corresponding to the modulation method used in the source BS of the reception signal, and then outputs a downstream received data. Examples of usable modulation methods include QPSK, 16 QAM, and 64 QAM.

The preamble detector 14 detects a preamble (synchronization signal) included in the frequency signal from the FFT unit 11. In the case where wireless signals from a plurality of BSs are received, each preamble may be detected by time division or individually (in parallel) in the frequency domain. When synchronization is established between the BSs, the preambles from the BS 1 and the BS 2 are received (detected) at the same reception timing. The preambles can be used to identify the transmission source of the BS by differentiating pattern for each transmission source of the BS. The received signal to be detected by the preamble detector 14 is not limited to the preamble. The signals transmitted from the plurality of BSs at the same transmission timing may be detected.

The received signal strength determining unit 15 periodically or non-periodically detects the reception level (received signal strength) of the signal received from the transmission source of the BS. The received signal strength determining unit 15 in this embodiment measures (estimates) the distance between the MS 3 and the BS on the basis of the detected reception level. The process of measuring the distance is not limited to that of measuring the reception level. For example, the distance may be measured in cooperation with the MS 3 having a GPS device and the peripheral BS information database 19.

The propagation delay detector (propagation delay measuring unit) 18 detects (measures) the amount of propagation delay of the signal received from the BS. The amount of propagation delay can be detected, for example, by measurement of the time (round trip time: RTT) until the MS 3 receives a response (ACK/NACK) to the signal after sending a signal to the BS.

The peripheral BS information database 19 can have information about the distribution of the BS 1 and BS 2, and identification information that identifies whether each BS is the master BS 1 having the GPS receiver 58 or the slave BS 2 having no GPS receiver 58.

The correction information detector 16, as described with reference to FIGS. 2(A) and 2(B), detects a difference or deviation in timing of reception of the synchronization signals (preambles) received from a plurality of BSs. This difference in timing of reception can be detected, for example, as a difference in timing at the peaks of power correction values of the received signal pattern and the synchronization signal pattern. The correction information detector 16 in this embodiment, for example, preferably has a resolution capable of detecting the peak of the power correction value as one sampling value. Besides, the correction information detector 16 can additionally or selectively detect, for example, a difference or deviation in frequency of reception of the synchronization signal (preamble). The difference in frequency of reception can be detected on the basis of phase information of the received synchronization signal.

The correction information detector 16 in this embodiment detects a difference in timing of transmission of the transmission source of each BS as an example of information that is susceptible to correction (correction information), depending on a difference in timing of reception (or both differences in timing or frequency of reception) of a synchronization signal (preamble) received from a plurality of BSs.

Besides, the detection of the correction information by the correction information detector 16 in this embodiment, for example, may be performed in the case where the reception levels of the synchronization signals received from the plurality of BSs, which is measured by the received signal strength determining unit 15, are equal or similar to each other (the measured results of the difference in timing of reception fall within a small deviation range that can be used for the synchronization between the BSs). This can improve the detection accuracy (reliability) of the correction information. The reception levels of the received signals from the master BS 1 and the slave BS 2, the information on the difference in the reception level, or the result ranked in accordance with the degree of the difference in the reception level (A: small level difference, B: medium level difference, C: large level difference) may be detected, and may be transmitted to the slave BS 2 with the correction information. The slave BS 2 can determine whether the received information must be used to adjust the transmission timing depending on the level information or the ranked result to anticipate improving the accuracy. For example, when multiple pieces of correction information are present, the correction information corresponding to the highest rank (a difference in the reception level is minimum) can be used.

The correction information may be corrected, for example, on the basis of the measurement results by the propagation delay detector 18. For example, the correction information detector 16 can correct the correction information by subtracting the each amount of propagation delay detected by the propagation delay detector 18 from the timing of reception of the preambles received from the master BS 1 and the slave BS 2. Since this can remove the propagation delay of the synchronization signal used to detect the correction information, the detection accuracy of the correction information can be more improved.

The lead/lag discrimination unit 17 detects whether the signal from the slave BS 2 is received earlier than or later than (lead or leg) the synchronization signal received from the master BS 1 being a reference. Whether the received synchronization signal is from which of BSs can be identified by the pattern of the received synchronization signal. Alternatively, the received synchronization signal can be identified on the basis of the current position of the MS 3 determined by GPS and the distribution information about each BS stored in the peripheral BS information database 19.

The correction information detector 16 and lead/lag discrimination unit 17 are used as an example of a detector that detects a difference in timing or frequency (or both of them) between a reference signal being any of the received signals from a plurality of BSs (for this embodiment, the synchronization signal transmitted from the master BS 1) and the synchronization signal received from other BS 2.

As described above using FIG. 1, in the synchronization between the slave BS 2-1 and slave BS 2-2, the lead/lag discrimination unit 17 detects the correction information using the reference signal, which is the received signal from the slave BS (reference slave BS) 2-1 establishing synchronization with the master BS 1, as described above. That is to say, in this case, the synchronization signal received from the reference slave BS 2 of which synchronization is established on the basis of the received signal from the master BS 1 functions as the reference signal used to detect the correction information. The reference slave BS 2 can be the BS 2 that is closer to the master BS 1 than the other BS 2. Which slave BS 2 is closer to the master BS 1 than the other BS 2 can be detected depending on the BS distribution information in the peripheral BS information database 19.

The results of discrimination (information regarding lead or lag) by the lead/lag discrimination unit 17 is sent to the burst generator 20 with the correction information detected by the correction information detector 16. For example, in the case where the signal received from the slave BS 2 lags the reference signal, a value illustrating a difference in timing of reception preceded by a plus sign can be correction information about the timing. In contrast, in the case where the signal received from the slave BS 2 leads the reference signal, a value illustrating a difference in timing of reception preceded by a minus sign can be correction information about the timing. When the reference signal cannot be determined in such a case that the MS 3 cannot recognize the master BS 1 or the reference slave BS 2-1, the correction information including the original compared information illustrating that timing of reception (or frequency of reception or both of them) of which of BSs is compared may be sent to the burst generator 20.

The burst generator 20 generates upstream transmission data such as user data or a signal including the correction information (an upstream burst). The correction information is included in the upstream burst to be transmitted to the BS other than the source BS of the reference signal. That is to say, in the synchronization between the master BS 1 and the slave BS 2, the upstream burst signal to the slave BS 2 includes the correction information. In contrast, in the synchronization between the slave BS 2-1 and the slave BS 2-2, the upstream burst signal to the slave BS 2-2 includes the correction information. However, the transmission (notification) of the correction information to the transmission source of BS, for example, to confirm the detected result in the MS 3 is not prohibited.

The modulator 21 modulates the upstream burst signal generated by the burst generator 20 in accordance with a predetermined modulation method. Examples of usable modulation methods include QPSK, 16 QAM, and 64 QAM, which are described above.

The pilot generator 22 generates a pilot signal that is known between the master BS 1 and the slave BS 2.

The mapping unit 23 maps the data signal modulated by the modulator 21 and the pilot signal generated by the pilot generator 22 into a predetermined subcarrier in the frequency domain. The upstream transmission data after mapping is output to the IFFT unit 24.

The IFFT unit 24 performs an IFFT process for the upstream transmission signal from the mapping unit 23 to convert it into a time domain signal.

The GI adder 25 adds a guard interval (GI) to the signal from the IFFT unit 24 in the time domain. The signal containing the GI is output to the wireless transmitter 26.

The wireless transmitter 26 executes predetermined wireless transmission processing for upstream transmission data to be transmitted to the master BS 1 or the slave BS 2 through the transmission and reception antenna 7. The processing can include, for example, DA conversion, frequency conversion into radio frequency (upconversion), and power amplification, for the transmission signal to the master BS 1 or the slave BS 2.

Thus, the difference in timing or frequency (or both of them) between the synchronization signal (reference signal) from the master BS 1 (or the reference slave BS 2) and the synchronization signal from the slave BS 2 is detected by the MS 3, and then the detected results are transmitted to the slave BS 2 other than the source BS 2 through the wireless transmitter 26 and the transmission and reception antenna 7.

In other words, the burst generator 20 is used as a notification unit notifying the detected result (correction information) by the correction information detector 16 and the lead/lag discrimination unit 17 to the BS other than the source BS of the reference signal (in FIG. 1, for example, the slave BS 2-1 or the slave BS 2-2).

(2.3) Slave BS 2

Figure 5:
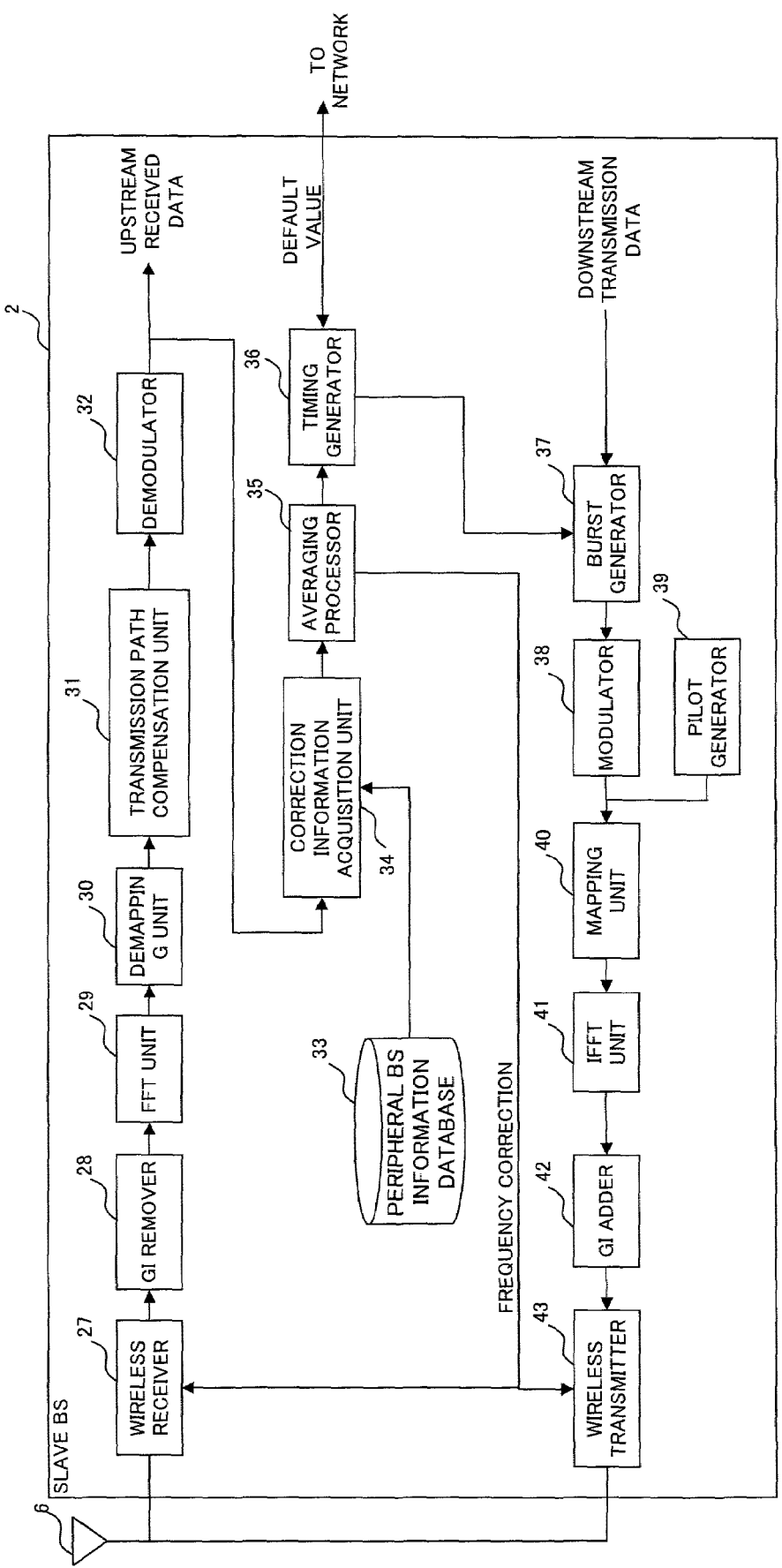
FIG. 5 is a block diagram of the slave base station illustrated in FIG. 1.

FIG. 5 is a block diagram of the BS 2 according to an embodiment. The BS 2 includes, for example, a transmission and reception antenna 6, a wireless receiver 27, a GI remover 28, an FFT unit 29, a demapping unit 30, a transmission path compensation unit 31, a demodulator 32, a peripheral BS information database 33, and a correction information acquisition unit 34. The slave BS 2 also includes, for example, an averaging processor 35, a timing generator 36, a burst generator 37, a modulator 38, a pilot generator 39, a mapping unit 40, an IFFT unit 41, a GI adder 42, and a wireless transmitter 43.

The transmission and reception antenna 6 is a wireless interface receiving an upstream wireless signal transmitted from the MS 3 and transmitting a downstream wireless signal to the MS 3. An antenna for transmission and an antenna for reception may be provided separately.

The wireless receiver 27 executes predetermined wireless reception processing for the wireless signal received from the MS 3 through the transmission and reception antenna 6. The processing includes, for example, low-noise amplification, frequency conversion to a baseband frequency (down conversion), and AD (analog-to-digital) conversion, for the received wireless signal.

The GI remover 28 removes a guard interval (GI) from the signal input from the wireless receiver 27, and then outputs the signal (effective symbol), from which the GI is removed, to the FFT unit 29.

The FFT unit 29 performs an FFT process on the signal output from the GI remover 28 to convert the time domain signal into a frequency domain signal, and then sends the converted signal to the demapping unit 30.

The demapping unit 30 extracts (demaps) the signal (symbol) mapped into a predetermined subcarrier of the frequency signal from the FFT unit 29. The signal demapped by the demapping unit 30 is demultiplexed into, for example, a pilot symbol and a data symbol. The pilot symbol is sent to a transmission path estimating unit (not illustrated), while the data symbol is sent to the transmission path compensation unit 31.

The transmission path compensation unit 31 compensates for the transmission path of the data symbol demultiplexed by the demapping unit 30 using an estimated value of a transmission path response estimated depending on the pilot symbol.

The demodulator 32 demodulates the data symbol compensated for the transmission path by a demodulation method corresponding to the modulation method used in the MS 3 (modulator 21), and then outputs an upstream received data.

The peripheral BS information database 33 have information about the distribution of the BS 1 and BS 2, and identification information to identify whether each BS is the master BS 1 having the GPS receiver 58 or the slave BS 2 having no GPS receiver 58.

The correction information acquisition unit 34 acquires (extracts) the correction information included in the upstream data from the MS 3, which is the demodulated result by the demodulator 32. At this time, in the case where the correction information does not include information regarding lead or lag, the lead or lag of the timing of transmission of the slave BS 2 can be detected on the basis of the aforementioned original compared information and the identification information of the BS 1 and BS 2 stored in the peripheral BS information database 33. For example, in the case where the correction information is information about a deviation in timing between the timing of transmission of the master BS 1 and the timing of transmission of the slave BS 2, the slave BS 2 can match its timing of transmission to the timing of transmission of the master BS 1. The correction information acquired by the correction information acquisition unit 34 is sent to a buffer (not illustrated) in the averaging processor 35.

The correction information acquisition unit 34 is used as an example of a receiver receiving from the MS 3 the detected result of the difference in timing or frequency (or both of them) between the reference signal the MS 3 receives from the master BS 1 and the signal received from the slave BS 2.

The averaging processor 35 averages multiple pieces of acquired correction information. For example, correction information received at each time instance is expressed as $\Delta t_i$ (where $i$ is an integer larger than 0, and $t_i$ is timing of reception of the correction information).

The averaging processor 35 averages the multiple pieces of correction information $\Delta t_i$ acquired by the correction information acquisition unit 34 at every predetermined time (period) in accordance with the following equation (1):

$$\Delta T_{adj} = \frac{1}{N} \sum_{i=0}^{N} \Delta t_i \quad (N \geq 1) \quad (1)$$

Where, $\Delta T_{adj}$ is averaged correction information (a timing adjusting time of the slave BS 2), and N is the number of the correction information. The predetermined time (period) may be a time (period) determined by the number of the receptions of correction information N.

The slave BS 2, for example, may receive the correction information $\Delta t_i$ from different MSs 3 at the same time or may receive the correction information $\Delta t_i$ from the same MS or other MSs 3 at different times. Assuming this case, the averaging processor 35 of this embodiment, for example, averages the multiple pieces of correction information $\Delta t_i$ acquired by the correction information acquisition unit 34 according to the equation (1), and then uses the averaged correction information $\Delta t_{adj}$ to correct (compensate) timing and frequency.

For example, the slave BS 2 of this embodiment controls (corrects) the generation timing of the downstream burst generated by the burst generator 37 using the correction information $\Delta t_{adj}$ averaged by the averaging processor 35. The slave BS 2 of this embodiment can also, for example, correct (match) the reception frequency of the wireless reception processing at the wireless receiver 27 and the transmission frequency of the wireless transmission processing at the wireless transmitter 43 into the frequency of the reference signal using the correction information $\Delta t_{adj}$ averaged by the averaging processor 35.

The timing generator 36 generates a generation timing of a burst signal on the basis of the averaged correction information (information about a difference in timing of reception) obtained by the averaging processor 35. The timing generator 36 of this embodiment, for example, may generate the generation timing of the burst signal on the basis of a predetermined default (timing information) obtained from an upper-level network (not illustrated) in the case where the correction information cannot be obtained from the MS 3. In other words, at the start-up of the slave BS 2, for example, the timing can be controlled on the basis of the time information obtained from the network. This allows the slave BS 2 to perform rough timing synchronization at such as the start-up.

The averaging processor 35 and the timing generator 36 are used as an example of a controller that controls the timing of transmission or frequency (or both of them) of the signal to be received by at least other MSs other than the MS 3 on the basis of the correction information received by the correction information acquisition unit 34.

The averaging processor 35 of this embodiment may calculate a variance of the difference in timing or frequency depending on multiple pieces of correction information to be stored in a buffer, and then may store the variance in the buffer. The averaging processor 35 and the timing generator 36 of this embodiment, for example, may perform the timing correction control and the frequency correction control on the basis of the variance in the case where the variance is less than or equal to a first threshold.

The averaging processor 35 of this embodiment may also calculate the number of receptions N of the correction information. The averaging processor 35 and the timing generator 36 of this embodiment, for example, may control the timing correction and the frequency correction in the case where the number of receptions N of the correction information is more than or equal to a second threshold.

This can restrain the dispersion of the correction information transmitted from the MS 3. Besides, since the slave BS 2 can correct its own timing and frequency on the basis of the correction information with high reliability, the percentage of establishment of synchronization between the BSs can be improved. Moreover, the slave BS 2 can decrease the repetition of the control (correction) operations to reduce the processing load.

The burst generator 37 adds, for example, a preamble to a downstream transmission data such as user data at the generation timing of the burst signal generated by the timing generator 36 to generate a downstream burst signal.

The modulator 38 modulates the downstream burst signal generated by the burst generator 37 in accordance with a predetermined modulation method. Examples of usable modulation methods include QPSK, 16 QAM, and 64 QAM, which are described above. The modulation method to be applied can be changed adaptively (adaptive modulation and coding: AMC control) in response to the communication quality between the slave BS 2 and MS 3.

The pilot generator 39 generates a pilot signal that is known between the slave BS 2 and the MS 3.

The mapping unit 40 maps the data signal modulated by the modulator 38 and the pilot signal generated by the pilot generator 39 into a predetermined subcarrier in the frequency domain. The signal mapped by the mapping unit 40 is output to the IFFT unit 41.

The IFFT unit 41 applies an IFFT process to the signal from the mapping unit 40 to convert the signal into a time domain signal.

The GI adder 42 adds a GI to the signal from the IFFT unit 41. The signal containing the GI is output to the wireless transmitter 43.

The wireless transmitter 43 executes predetermined wireless transmission processing for downstream data to be transmitted to the MS 3 through the transmission and reception antenna 6. The processing includes, for example, DA conversion, frequency conversion into radio frequency (upconversion), and power amplification, for the transmission data to the MS 3.

Thus, the downstream signal generated by the slave BS 2 is transmitted by radio to the MS 3 through the wireless transmitter 43 and the transmission and reception antenna 6.

(2.4) Example of Operation of Wireless Communication System (Process of Establishing Synchronization)

Figure 6:
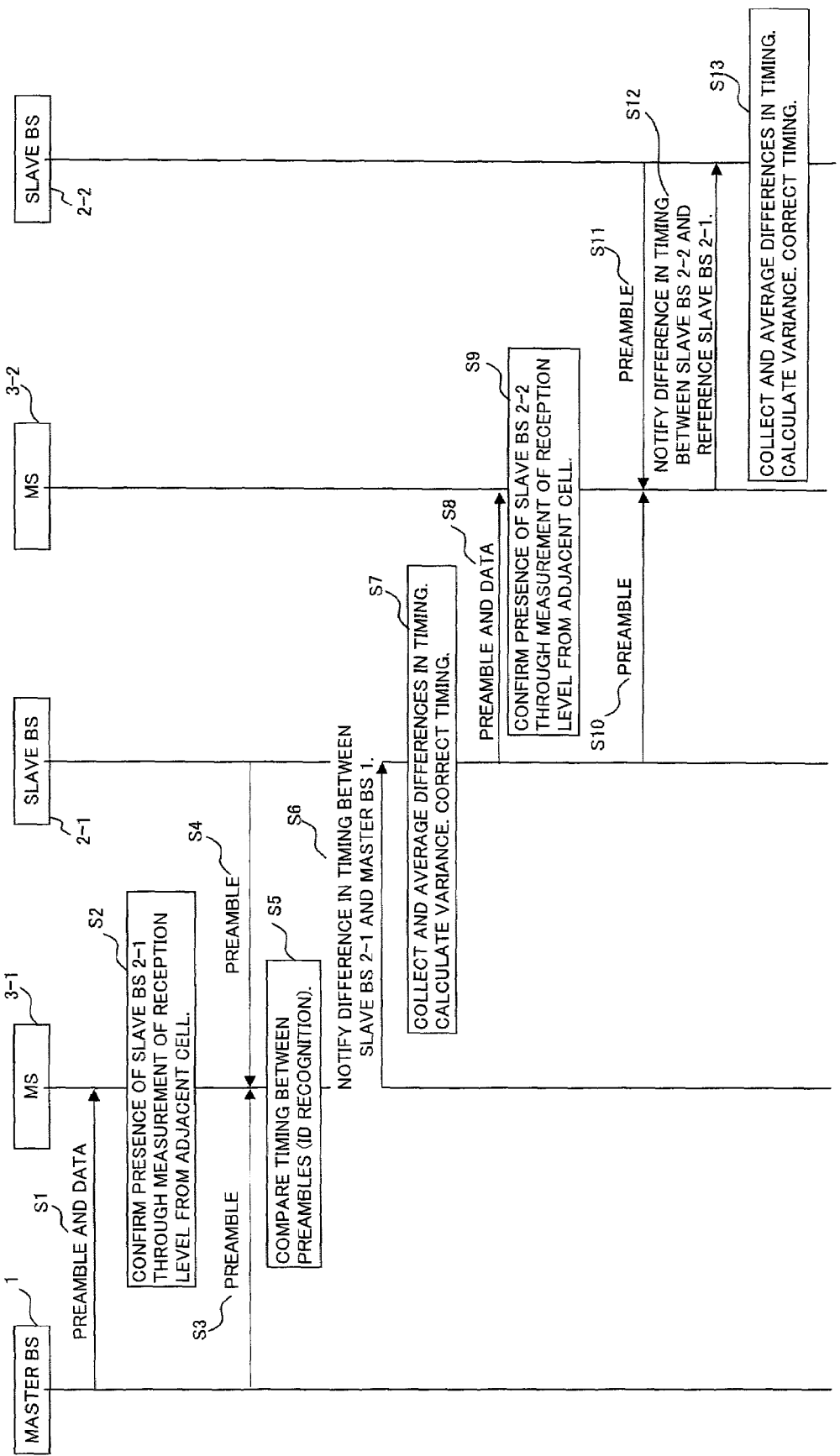
FIG. 6 is a schematic view of an operation of the wireless communication system illustrated in FIG. 1.

An example of the operation of the wireless communication system is described below with reference to FIG. 6.

The MS 3-1 belonging to the cell 4-1 provided by the master BS 1 receives a downstream signal including a preamble and user data from the master BS1 (Step S1).

The MS 3-1 measures the reception level of the signal transmitted from the cell 4-2 (adjacent cell) adjacent to the cell 4-1, to which the MS 3-1 belongs, provided by the master BS 1, and then confirms (recognizes) the presence of the slave BS 2-1 (Step S2).

When the MS 3-1 recognizes that it belongs to both the cell 4-1 provided by the master BS 1 and the cell 4-2 provided by the slave BS 2-1, the MS 3-1 receives the downstream signals from the master BS 1 and the slave BS 2-1, and then detects the respective preambles (Steps S3 and S4).

The MS 3-1 then identifies the BSs that transmits the preambles on the basis of the BS identification information indicated by each of the preambles and stored in the peripheral BS information database 19 (ID recognition, Step S5).

The MS 3-1 detects the difference in timing between the timing of reception of the reference signal that is the preamble received from the master BS 1 and the timing of reception of the preamble received from the slave BS 2-1, and then notifies the difference to the slave BS 2-1 (Step S6). As described above, the MS 3-1 can additionally or selectively detect the difference in frequency of reception in addition to the difference in timing of reception, and then can notify the difference to the slave BS 2-1.

The slave BS 2-1 that receives the difference in timing (correction information) detected by the MS 3-1 collects multiple pieces of correction information received in a predetermined period of time, and then calculates the mean and the variance of them. Then, the slave BS 2-1 corrects its timing of transmission (or its frequency of transmission or both of them) on the basis of the mean in the case where the variance is less than or equal to a first threshold, where the number of receptions of the correction information is more than or equal to a second threshold, or where the both conditions are satisfied (Step S7).

Thus, the slave BS 2-1 can correct its timing of transmission (or its frequency of transmission or both of them) on the basis of the difference in timing of transmission (or the difference in frequency of transmission or both of them) to the reference signal from the master BS 1 received through the MS 3-1. As a result, inter-base station synchronization can be easily established even between the master BS 1 having a GPS receiver and the slave BS 2-1 having no GPS receiver.

In establishing inter-base station synchronization between the slave BSs 2, for example, the following processes are performed:

The MS 3-2 that belongs to the cell 4-2 provided by the slave BS (reference slave BS) 2-1 receives a downstream signal including a preamble and user data from the slave BS 2-1 (Step S8).

The MS 3-2 measures the reception level of the signal transmitted from the cell 4-3 (adjacent cell) adjacent to the cell 4-2, to which the MS 3-2 belongs, provided by the slave BS 2-1, and then confirms (recognizes) the presence of the slave BS 2-2 (Step S9).

When the MS 3-2 recognizes that it belongs to both the cell 4-2 provided by the slave BS 2-1 and the cell 4-3 provided by the slave BS 2-2, the MS 3-2 receives the downstream signals from the slave BS 2-1 and the slave BS 2-2, and then detects the respective preambles (Steps S10 and S11).

The MS 3-2 identifies the BSs that transmit the preambles on the basis of the BS identification information indicated by each of preambles and stored in the peripheral BS information database 19 (ID recognition).

The MS 3-2 detects the difference in timing between the timing of reception of the reference signal that is the preamble received from the slave BS 2-1 and the timing of the reception of the preamble received from the slave BS 2-2, and then notifies the difference to the slave BS 2-2 (Step S12 ). As described above, the MS 3-2 can additionally or selectively detect the difference in frequency of reception in addition to the difference in timing of reception, and then can notify the difference to the slave BS 2-2.

At this time, the signal used as a reference signal by the MS 3-2 is previously timing-controlled by the slave BS (reference slave BS) 2-1 on the basis of the reference signal from the master BS 1.

The slave BS 2-2 that receives the difference in timing (correction information) detected by the MS 3-2 collects multiple pieces of correction information received in a predetermined period of time, and then calculates the mean and the variance of them. Then, the slave BS 2-2 corrects its timing of the transmission (or its frequency of the transmission or both of them) on the basis of the calculated mean in the case where the variance is less than or equal to a first threshold, the number of receptions of the correction information is more than or equal to a second threshold, or the both conditions are satisfied (Step S13).

Thus, even the slave BS 2 having no GPS receiver can establish synchronization with the master BS 1 on the basis of the signal from the master BS 1.

Consequently, there is no necessity that all the BSs in the system require a GPS receiver to reduce the scale of the slave BS 2 and associated cost. Besides, the cost for the system infrastructure can be reduced.

In addition, since the synchronization is established using the MS 3 capable of receiving signals from a plurality of BSs, the synchronization can be established without keeping a significantly close distance between adjacent BSs (adjacent cells). This moderates the restriction on the distribution of the BSs. Besides, synchronization among a large number of BSs can easily be established by repeatedly establishing synchronization between the slave BS 2 through the MS 3 with reference to one of the BSs.

(3) Variation

In the aforementioned wireless communication system, the MS 3 as an example of the mobile station detects and notifies correction information (a difference in timing or frequency) on the basis of received signals from a plurality of BSs. In contrast, the wireless communication system of this variation may additionally include a dedicated fixed station that detects and notifies the correction information.

Figure 7:
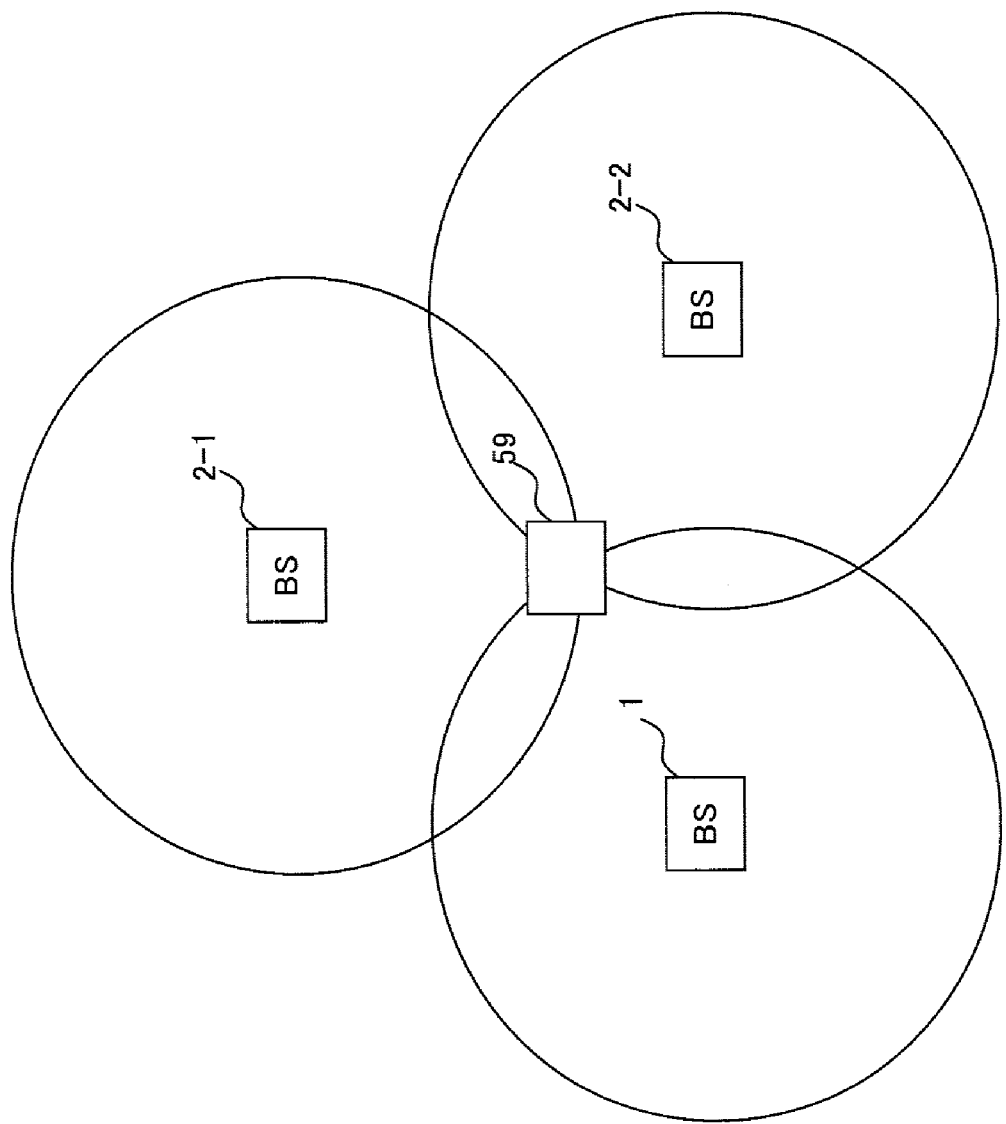
FIG. 7 is a schematic view of a wireless communication system in accordance with a variation.

FIG. 7 is a wireless communication system according to this variation.

Figure 8:
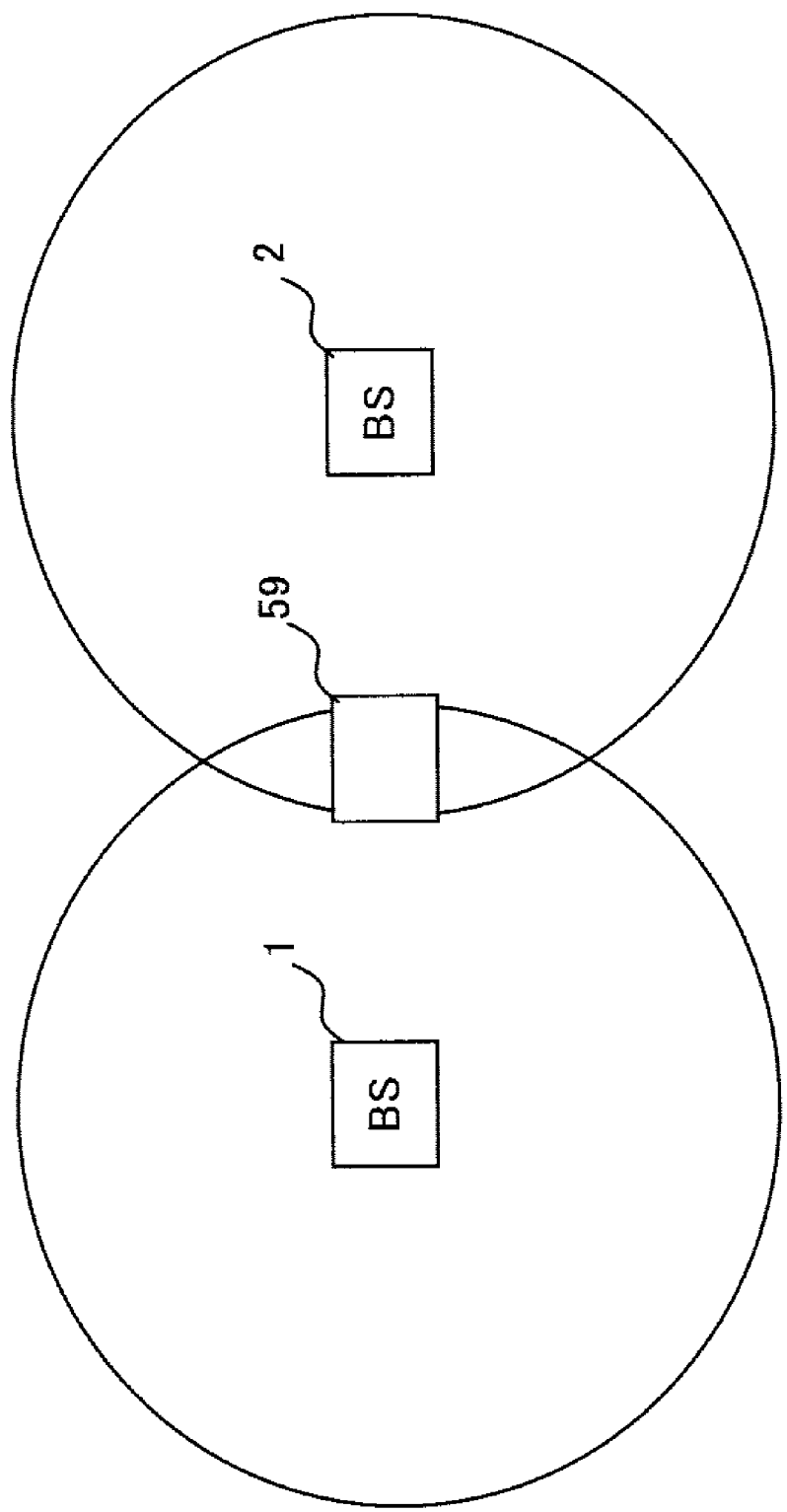
FIG. 8 is a schematic view of a wireless communication system in accordance with another variation.

The wireless communication system includes, for example, a master BS 1, slave BSs 2-1 and 2-2, and a fixed station 59. The numbers of the master BS 1, the slave BSs 2-1 and 2-2, and the fixed stations 59 are not limited to those in FIG. 7. For example, as illustrated in FIG. 8, the wireless communication system of this variation may include the master BS 1, the slave BS 2, and the fixed station 59.

In the wireless communication system of this variation, the fixed station 59 can be located, for example, at a position having the same distance from the plurality of BS 1 and BS 2 (a position overlapping cells provided by the BSs 1 and BSs 2). This allows the fixed station 59 to receive synchronization signals (for example, preambles) included in the signals transmitted by the BS 1 and BS 2 at the same time.

Since the fixed station 59 of this variation is located at a position having the same distance from the BS 1 and BS 2, the signals received from the BSs 1 and BS 2 have the same reception level and the same amount of propagation delay. Consequently, the fixed station 59 of this variation may not detect the amount of propagation delay and the reception level, unlike the aforementioned MS 3.

Figure 9:
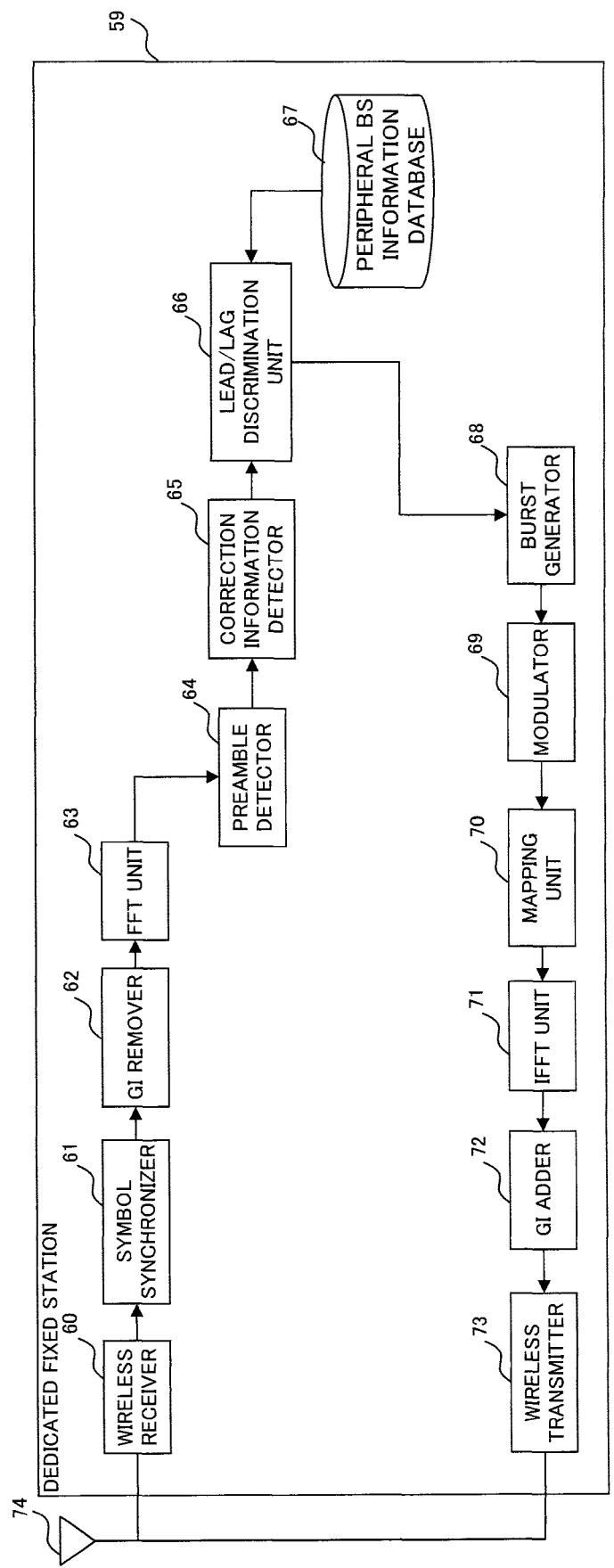
FIG. 9 is a block diagram of the dedicated fixed station illustrated in FIGS. 7 and 8.

For that reason, as illustrated in FIG. 9, the fixed station 59 of this variation includes, for example, a transmission and reception antenna 74, a wireless receiver 60, a symbol synchronizer 61, a GI remover 62, an FFT unit 63, a preamble detector 64, and a correction information detector 65. The fixed station 59 of this variation also includes, for example, a lead/lag discrimination unit 66, a peripheral BS information database 67, a burst generator 68, a modulator 69, a mapping unit 70, an IFFT unit 71, a GI adder 72, and a wireless transmitter 73.

The wireless receiver 60, the symbol synchronizer 61, the GI remover 62, the FFT unit 63, and the preamble detector 64 have the same functions as those of the wireless receiver 8, the symbol synchronizer 9, the GI remover 10, the FFT unit 11, and the preamble detector 14, respectively, which are described above.

The correction information detector 65 of this variation detects a difference or deviation in timing of reception of the synchronization signals (preambles) received from the BSs. This difference in timing of the reception can be detected, for example, as a difference in timing at the peaks of power correction values of the received signal pattern and the synchronization signal pattern. The correction information detector 65 can also detect additionally or selectively, for example, a difference or deviation in frequency of the reception of the synchronization signals (preambles). The difference in frequency of the reception can be detected on the basis of phase information of the received synchronization signals.

In this variation, which of the received signals from the BS 1 and BS 2 located around the fixed station 59 is to be used as a reference signal may be previously stored in the peripheral BS information database 67.

In other words, the correction information detector 65 of this variation determines the received signal from the master BS 1 as the reference signal on the basis of the information stored in the peripheral BS information database 67, and then detects, for example, the difference in timing of the reception between the reference signal and the received signal from the slave BS 2.

The lead/lag discrimination unit 66 detects whether the signal from the slave BS 2 is received earlier than or later than (lead or leg) the synchronization signal received from the master BS 1, being to be the reference. Whether the received synchronization signal is from which of BSs can be identified by the pattern of the received synchronization signal. Alternatively, the received synchronization signal can be identified on the basis of the known position of the fixed station 59 and the distribution information of each of BSs stored in the peripheral BS information database 67.

The discriminated result (information regarding lead or lag) by the lead/lag discrimination unit 66 is sent to the burst generator 68, with the correction information detected by the correction information detector 65.

The burst generator 68 generates an upstream transmission data such as user data or a signal (an upstream burst) including the correction information. The correction information is included in the upstream burst to be transmitted to BSs other than the source BS of the reference signal. For details, in the synchronization between the master BS 1 and the slave BS 2, the correction information is included in the upstream burst signal to the slave BS 2. In contrast, in the synchronization between the slave BS 2-1 and slave BS 2-2, the correction information is included in the upstream burst signal to the slave BS 2-2. However, the transmission (notification) of the correction information to the transmission source of BS, for example, to confirm the detected result by the fixed station 59 is not prohibited.

The modulator 69 modulates the upstream burst signal generated by the burst generator 68, in accordance with a predetermined modulation method. Examples of usable modulation methods include QPSK, 16 QAM, and 64 QAM, and so on, which are described above.

The mapping unit 70 maps the data signal modulated by the modulator 69 into a predetermined subcarrier in the frequency domain. The upstream transmission signal after mapping is output to the IFFT unit 71.

The peripheral BS information database 67, the IFFT unit 71, the GI adder 72, the wireless transmitter 73, and the transmission and reception antenna 74 have the same functions as those of the peripheral BS information database 19, the IFFT unit 24, the GI adder 25, the wireless transmitter 26, and the transmission and reception antenna 7, respectively, which are described above.

Thus, this variation can have advantages similar to those of the aforementioned embodiment without substantial systemic changes through installation of the fixed station 59 having a minimum configuration that can establish synchronization between the BS 1 and BS 2, at a position having the same distance from the BSs 1 and BSs 2.

(4) Other Variations

The configuration and processing of the aforementioned each BS 1, BS 2, and MS 3 can be sorted out as needed or can be combined accordingly.

In the above embodiment, the mobile WiMAX system is described as an example, however, other wireless communication systems can also have advantages similar to those of the embodiment. On this occasion, for example, a random access channel (RACH) in place of the preamble can be used as a synchronization signal.

Furthermore, in the above embodiment, the MS 3 detects lead or lag between the reference signal and other received signals. Alternatively, the slave BS 2 may detect the lead or lag by notifying information necessary for the detection (for example, a BS identification signal) from the MS 3 to the slave BS 2. In this case, the peripheral BS information database 19 is not essential for the MS 3.

Besides, when the MS 3 is not present in the overlapping zone of the cells provided by the BS 1 and BS 2, the communication interference between the adjacent BS 1 and BS 2 can be neglected. Thus, the BS 1 and BS 2 may communicate by radio on the basis of individual timings (defaults about timings of transmission and reception). The default can be received from an upper-level network at the start-up of the BS.

After establishment of the synchronization through the aforementioned synchronization process, the frequency of the detection of the correction information by the MS 3 or the synchronization control on the basis of correction information by the slave BS 2 may be reduced.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment has been described in detail, it should be understood that the various changes, substitutions, and alterations could be made hereto without departing from the spirit and scope of the invention.

What is claimed is:

1. A communication device, comprising:
   a detector which detects a difference in frequency between
      a reference signal being any of the received signals from
      a plurality of base stations and each of the other received
      signals; and a notifying unit which notifies the results of the detection by the detector to base stations other than the source station of the reference signal, wherein the results of the detection are used when the base stations other than the source station of the reference signal control the frequency of transmission of signals to be received by other communication devices.

2. The communication device according to claim 1, wherein the detector performs the detection in the case where the level between the reference signal and each of the other received signals is equal to or within a predetermined deviation.

3. The communication device according to claim 1, wherein the detector determines the received signal to be used as the reference signal on the basis of the base station identification information of the base stations contained in the received signals from the base stations.

4. The communication device according to claim 1, wherein the reference signal is a signal received from a base station that establishes the synchronization of communication using a signal received by a global positioning system (GPS) receiver.

5. The communication device according to claim 1, wherein the reference signal is a signal received from a base station that establishes the synchronization of communication using a signal received by a global positioning system (GPS) receiver or from a base station that establishes the synchronization by receiving the notification in the base stations.

6. The communication device according to claim 1, wherein the communication device is a fixed station installed at the same distance from the base stations.

7. A base station capable of communicating with a communication device, the base station comprising:
    a receiver which receives results of detection notified by the communication device which detects a difference in frequency between a signal received from the base station and a reference signal received from another base station; and
    a controller which controls the frequency of transmission of the signal to be received by other communication devices on the basis of the results of detection received by the receiver.

8. The base station according to claim 7, wherein the controller performs the control on the basis of the results of detection that are time-averaged.

9. The base station according to claim 7, wherein the controller performs the control in the case where a variance of the results of detection is less than or equal to a threshold about the variance.

10. The base station according to claim 7, wherein the controller performs the control in the case where a number of receptions of the results of detection is more than or equal to a threshold about the number of the receptions.

11. The base station according to claim 7, wherein the controller performs the control on the basis of predetermined timing information until the detection result is received.

12. A method of communication of a communication device, the method comprising:
    detecting a difference in frequency between a reference signal being any one of the received signals from a plurality of base stations and each of the other received signals; and
    notifying the results of detection to base stations other than the source station of the reference signal,
    wherein the results of detection are used when the base stations other than the source station of the reference signal control the frequency of transmission of signals to be received by other communication device.

13. A method of communication of a base station capable of communicating with a communication device, the method comprising:
    receiving results of detection notified by the communication device which detects a difference in frequency between a signal received from the base station and a reference signal received from another base station; and
    controlling the frequency of transmission of the signal to be received by other communication devices on the basis of the results of the detection.

14. A communication system, comprising:
    a plurality of base stations;
    at least one communication device capable of communicating with the plurality of base stations;
    a detector which detects a difference in frequency between a reference signal being any of the received signals from the plurality of base stations and each of the other received signals;
    a notifying unit which notifies the results of detection by the detector to base stations other than the source station of the reference signal; and
    a controller which controls the frequency of transmission of signal to be received by other communication devices on the basis of the results of detection notified by the notifying unit.

15. A communication device, comprising:
    a detector which detects a difference in timing between a reference signal being any of the received signals from a plurality of base stations and each of the other received signals; and
    a notifying unit which notifies the results of the detection by the detector to base stations other than the source station of the reference signal,
    wherein the results of the detection are used when the base stations other than the source station of the reference signal control the timing of transmission of signals to be received by other communication devices, and
    wherein the detector performs the detection in the case where the level between the reference signal and each of the other received signals is equal to or within a predetermined deviation.

16. A base station capable of communicating with a communication device, the base station comprising:
    a receiver which receives results of detection notified by the communication device which detects a difference in timing between a signal received from a base station and a reference signal received from another base station; and
    a controller which controls the timing of transmission of the signal to be received by other communication devices on the basis of the results of detection received by the receiver,
    wherein the communication device performs the detection in the case where a level between the reference signal and each of the other received signals is equal to or within a predetermined deviation.

17. A method of communication of a communication device, the method comprising:
    detecting a difference in timing between a reference signal being any one of the received signals from a plurality of base stations and each of the other received signals; and
    notifying the results of detection to base stations other than the source station of the reference signal,
    wherein the results of detection are used when the base stations other than the source station of the reference signal control the timing of transmission of signals to be received by other communication device, wherein the detection is performed in the case where a level between the reference signal and each of the other received signals is equal to or within a predetermined deviation.

18. A method of communication of a base station capable of communicating with a communication device, the method comprising:

receiving the results of detection notified by the communication device which detects a difference in timing between a signal received from the base station and a reference signal received from another base station; and controlling the timing of transmission of the signal to be received by other communication devices on the basis of the results of the detection, wherein the communication device performs the detection in the case where a level between the reference signal and each of the other received signals is equal to or within a predetermined deviation.

19. A communication system, comprising:

a plurality of base stations;

at least one communication device capable of communicating with the plurality of base stations;

a detector which detects a difference in timing between a reference signal being any of the received signals from the plurality of base stations and each of the other received signals;

a notifying unit which notifies the results of detection by the detector to base stations other than the source station of the reference signal; and a controller which controls the timing of transmission of signal to be received by other communication devices on the basis of the results of detection notified by the notifying unit, wherein the detector performs the detection in the case where a level between the reference signal and each of the other received signals is equal to or within a predetermined deviation.

20. A communication device, comprising:

a detector which detects a difference in timing between a reference signal being any of the received signals from a plurality of base stations and each of the other received signals;

a notifying unit which notifies the results of the detection by the detector to base stations other than the source station of the reference signal; and a delay-measuring unit which measures propagation delay of signals received from the plurality of base stations, wherein the results of the detection are used when the base stations other than the source station of the reference signal control the timing of transmission of signals to be received by other communication devices, and wherein the detector corrects the difference in timing on the basis of the results measured by the delay-measuring unit.

* * * * *